United States Patent [19]
Hoffschmidt et al.

[11] Patent Number: 5,964,216
[45] Date of Patent: Oct. 12, 1999

[54] TROUGH-TYPE PARABOLIC CONCENTRATOR

[75] Inventors: Bernhard Hoffschmidt, Bergisch Gladbach; Manfred Boehmer, Lohmar; Peter Binner, Bonn, all of Germany

[73] Assignee: Deutsches Zentrum fuer Luft- und Raumfahrt e.V., Bonn, Germany

[21] Appl. No.: 09/161,449

[22] Filed: Sep. 28, 1998

[30]     Foreign Application Priority Data

Oct. 10, 1997  [DE]  Germany ................. 197 44 767

[51] Int. Cl.⁶ ............................................. F24J 2/10
[52] U.S. Cl. ................. 126/696; 126/694; 359/867
[58] Field of Search ................. 126/696, 684, 126/692–694, 695; 359/867–869, 871, 900

[56]         References Cited
         U.S. PATENT DOCUMENTS 4,115,177  9/1978  Nelson ............................ 126/696
4,249,514  2/1981  Jones ............................. 126/696
4,372,027  2/1983  Hutchinson ...................... 126/696
4,571,812  2/1986  Gee .............................. 126/696
4,611,575  9/1986  Powell ........................... 126/696

*Primary Examiner*—James C. Yeung
*Attorney, Agent, or Firm*—Diller, Ramik & Wight, PC

[57]           ABSTRACT

A trough-type parabolic concentrator (1) for a solar thermal power plant comprises a reflector plate (3) bent in trough shape and a support structure (4) for supporting the reflector plate (3) and comprising a plurality of wooden segments (2) arranged in a row in the longitudinal direction of the trough. Each segment (2) is assembled from a plurality of wooden frames (5). Using wooden frames (5) as the basic element of the supporting structure (4) allows for a lightweight, simple and low-cost structure of the trough-type parabolic concentrator (1).

14 Claims, 3 Drawing Sheets

TROUGH-TYPE PARABOLIC CONCENTRATOR

BACKGROUND ART

The present invention relates to a trough-type parabolic concentrator for a solar thermal power plant, which focuses incident solar radiation onto an absorber pipe in which a heat transfer medium flows that is heated by the concentrated solar radiation.

Parabolic concentrators of the trough type are implemented, for example, in so-called SEGS plants (Solar Energy Generating Systems) in California. The reflectors of these trough-type parabolic concentrators are made of self-supporting composite glass silvered on the rear face. Therefore, the support structure for the reflectors only has to bear the weight of the reflectors; a shaping support of the reflector is not required. Due to the great effort of producing and mounting these power plants, they operate economically only in the order of about 50 MW and more. The investment required for a power plant of this caliber is rather high, opposing the implementation of such power plants in various sunny, but economically weak regions of the world.

In the past, efforts have been made to simplify the structure of trough-type parabolic concentrators, so as to lower the costs for a power plant. As a reflector, thin anodized aluminum sheet was used, entailing a substantial reduction of weight compared to the silvered composite glass. There is a drawback, however, in that aluminum sheet does not have the self-supporting properties of composite glass. Thus supporting structures are required that support the aluminum sheet such that it is held in the parabolic shape. However, known supporting structures of aluminum or steel are rather complex and heavy, which is why they are correspondingly expensive.

From U.S. Pat. No. 4,249,514, a solar concentrator of lightweight structure comprising a plurality of adjacent segments is known. Each segment has two integral side members with stepped surfaces approximating a curvilinear shape. Reflector bars are fixed on the respective steps of the two side members. On the rear, the side members are supported by a truss structure. The truss structure is made of thin longitudinal struts and tensioning wires fastened thereto. In this solar concentrator, since the required shaping support for a reflector plate is not present, no continuous reflector plate can be installed that would have a better efficiency than single reflector bars. It is a disadvantage of the lightweight structure that the individual segments are not rigid in themselves so that each segment requires a support fastened to the ground, requiring extensive structural efforts.

It is an object of the present invention to provide a trough-type parabolic concentrator that has a simple stricture and may be implemented economically.

SUMMARY OF THE INVENTION

The trough-type parabolic concentrator of the present invention comprises a reflector plate curved like a trough, which is preferably made of anodized aluminum sheet or a sheet onto which thin glass mirrors are adhered, and a supporting structure supporting the reflector plate, the structure comprising a plurality of wooden segments arranged in a row along the length of the trough. Each segment is composed of a plurality of wooden frames, the longitudinal and transverse bars of the frames supporting the reflector plate in a shaping manner. Using frames and segments provides for a modular structure of the trough-type parabolic concentrator both in the longitudinal and the transverse directions, giving a high degree of flexibility in the design and realization of the power plant. Since wood is a lightweight, easy to work and low-cost material and, further, wooden frames of relatively thin bars are used, weight and costs of the trough-shaped parabolic concentrator can be reduced so that even smaller power plants can be made to operate economically. Another advantage lies with the simple mounting of the trough-type parabolic concentrator, since, as a result of the simple structure and the light weight of the wooden frames, even large trough-type parabolic installations may be assembled almost entirely in situ so that transports of often rather large parts from the production site to the building site can be dispensed with. Due to the self-supporting frame structure of the trough-type parabolic concentrator it is not necessary to set the trough-type parabolic concentrator on supporting stands at each segment. Since the supporting structure can transfer forces in any direction, supporting stands at the outermost segments are sufficient.

BRIEF DESCRIPTION OF THE DRAWINGS

The following is a detailed description of an embodiment of the present invention with reference to the accompanying drawings.

In the Figures.

DETAILED DESCRIPTION OF A PREFERRED EMBODIMENT

Figure 1:
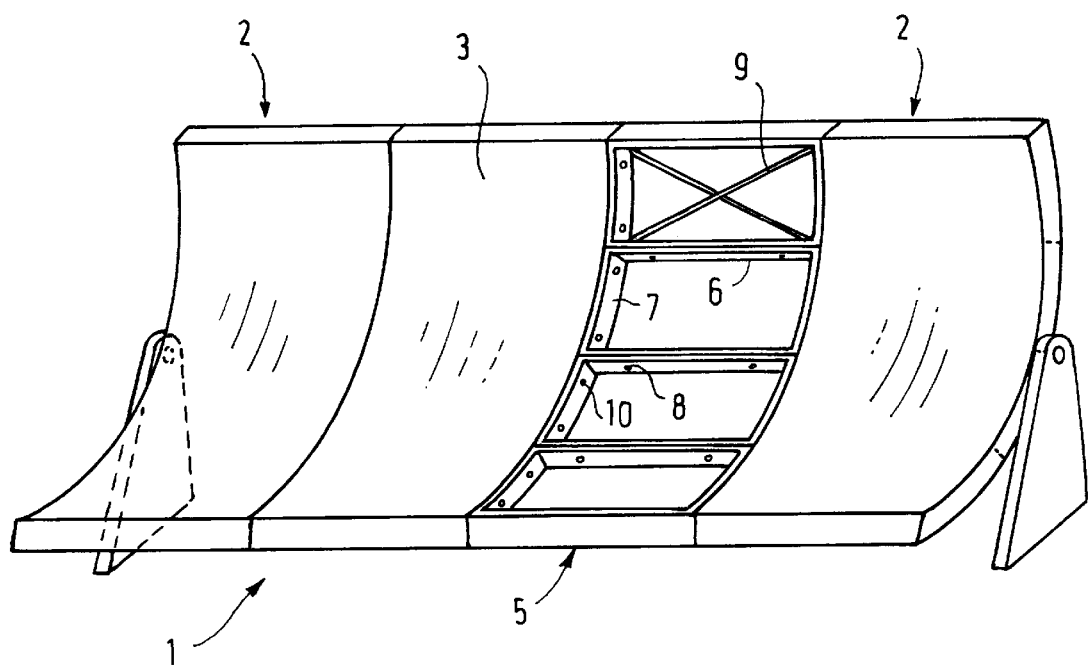
FIG. 1 is a perspective view of the trough-type parabolic concentrator.
Figure 2:
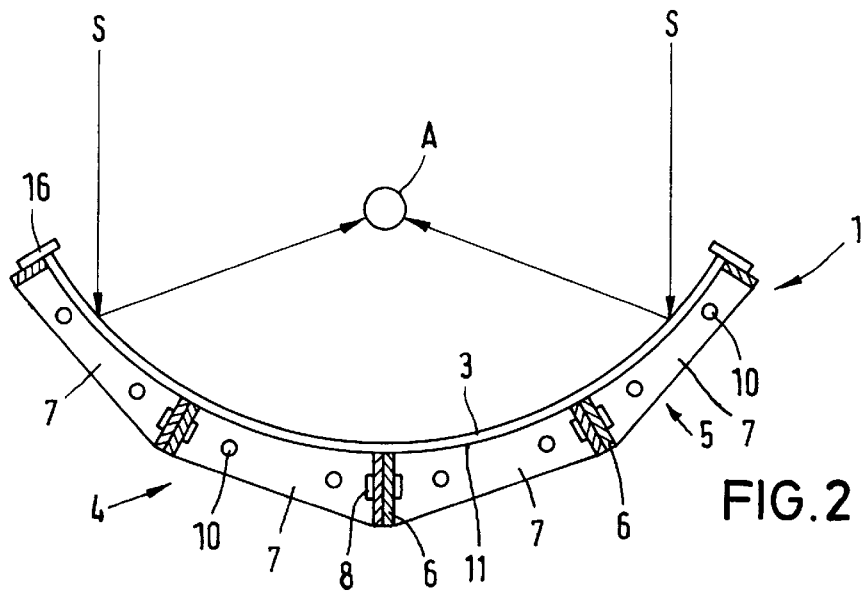
FIG. 2 shows a cross-sectional view of the trough-type parabolic concentrator.
Figure 3:
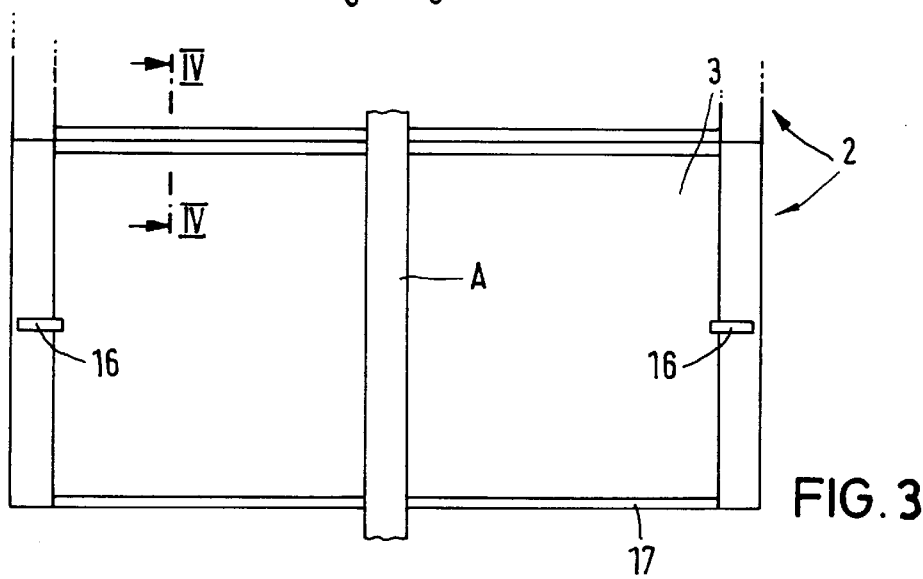
FIG. 3 is a top plan view of a segment of the trough-type parabolic concentrator.
Figure 4:
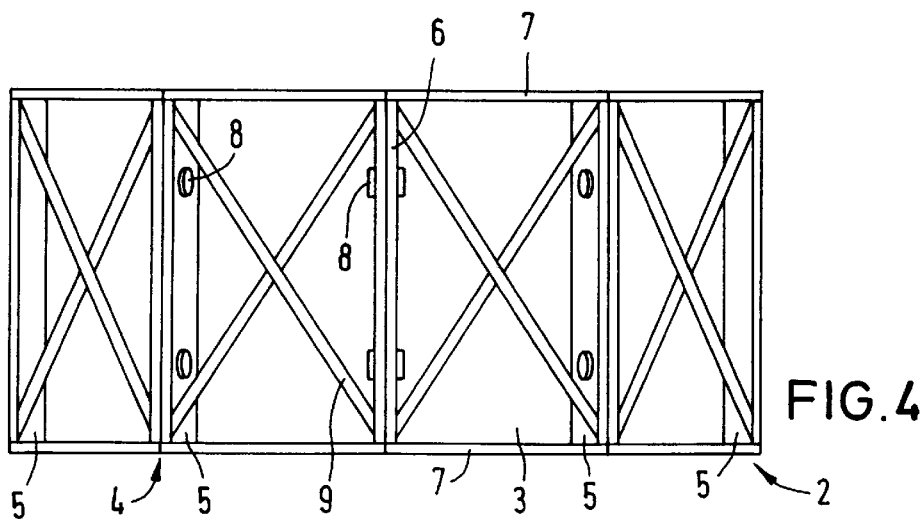
FIG. 4 is a bottom view of the segment.

In solar thermal power plants comprising trough-type parabolic concentrators, incident solar radiation S is focused onto an absorber pipe A (FIG. 2) by means of trough-type parabolic concentrators 1. A heat transfer medium, such as oil or water, which is heated by the concentrated solar radiation and transported to a subsequent consuming device flows through the absorber pipe A. Typically, the width of the aperture of a trough-type parabolic concentrator is about 2 to 5 m, whereas the diameter of the absorber pipe is in the order of centimeters.

Referring to FIGS. 1–4, the structure of the trough-type parabolic concentrator 1 will be described in more detail. The trough-type parabolic concentrator 1 is divided into a plurality of segments 2 (FIG. 1) in the longitudinal direction of the trough, i.e. in the axial direction of the absorber pipe A. Each segment 2 has a reflector plate 3 bent in trough-shape for focusing the incident solar radiation S onto the absorber pipe A. The length of a segment 2, i.e. the dimension in the longitudinal direction of the trough, is determined by the width of the material of the reflector plate 3. The reflector plate 3 is made of a thin aluminum sheet of 0.5 to 1 mm in thickness, an anodized surface of the reflector plate 3 forming the actual reflector.

The reflector plate 3 is supported by a supporting structure 4. The supporting structure 4 of a segment 2 comprises a plurality of open boxes 5, open at the top and the bottom and made of plywood glued together in a waterproof manner. The lateral bars of a frame 5 are interconnected in comb-like engagement and may be given additional rigidity by reinforcing angles provided on the inside. The surfaces of the frame 5 are sealed in a waterproof manner by a resin so as to guarantee long-time strength of the wood.

The frames 5 are designed such that, when assembled to form a segment 2, they define a parabolic top edge 11. The longitudinally extending longitudinal bars 6 of a box 5 are fixed to the transverse bars 7 at an angle such that their top edges 11 rest almost tangentially on the reflector plate 3. The top edges of the transverse bars 7 are in the shape of parable segments so that the assembled frames 5, with their transverse bars 7, form a parabolic trough onto which the reflector plate 3 is placed so that the flexible reflector plate 3 is given its shape by the longitudinal and transverse bars 6, 7 of the boxes 5. The individual boxes 5 are connected by screws 8. The surfaces of the necessary bores are sealed with a resin to prevent humidity from penetrating into the wood. The bottom side of each frame 5 has two diagonally mounted metal bands 9 for reinforcing the frame.

Figure 5:
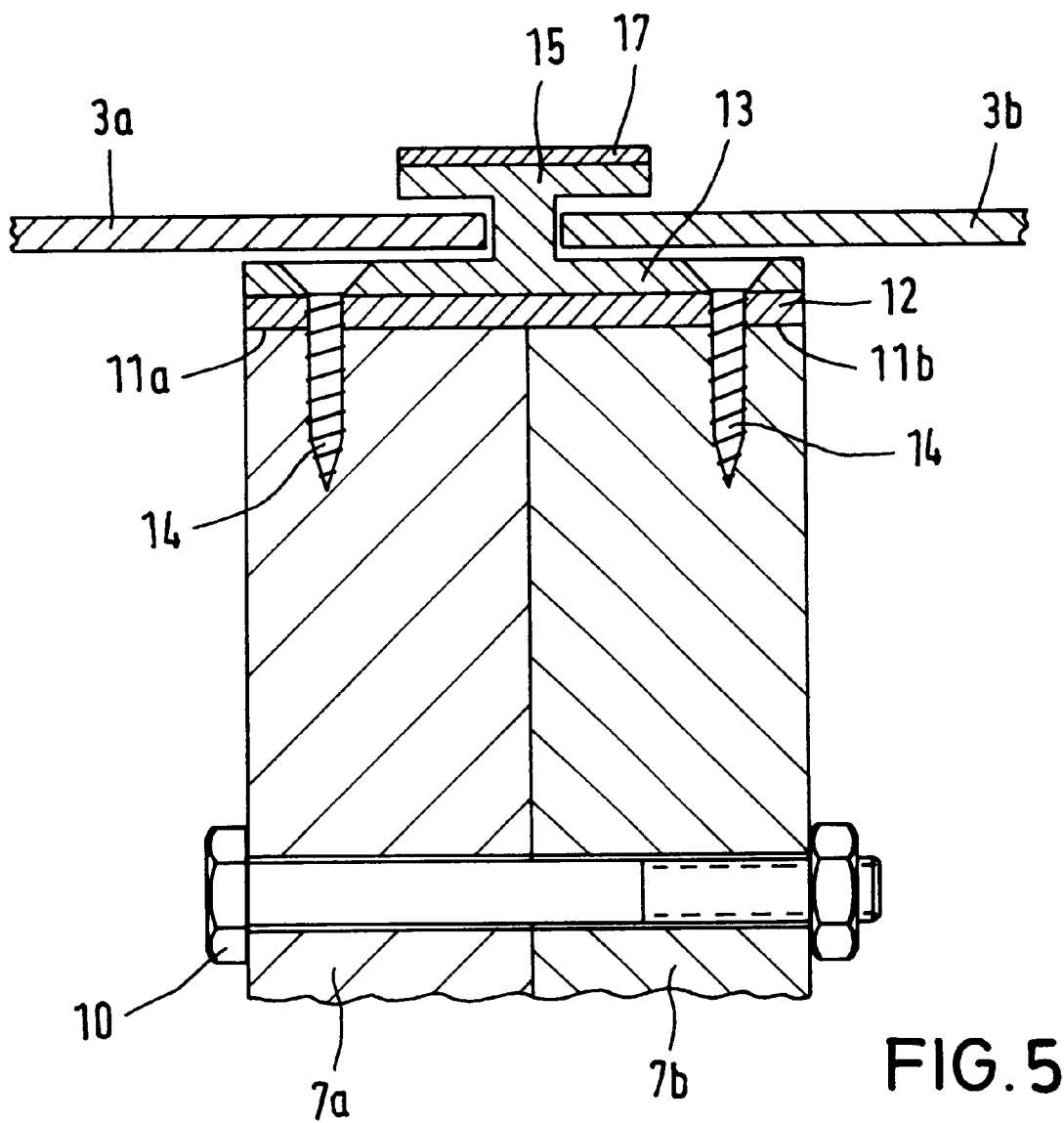
FIG. 5 is a section along line IV—IV in FIG. 3.

FIG. 5 illustrates the joint between two segments 2 interconnected by screws 10 extending through the transverse bars 7a, 7b of the frames 5. The parable segment-shaped top edges 11a, 11b of the transverse bars 7a, 7b are coated with a layer 12 preventing the penetration of humidity. A trough-shaped guide rail 13 for the reflector plates 3a and 3b, respectively, is fastened to the transverse bars 7a, 7b through screws 14. The guide rail 13 is an aluminum profile and comprises an upward protruding web 15 embracing the reflecting surfaces of the reflector plates 3a, 3b so that the reflector plates 3a, 3b are held in the guide rail and are forced to take a parabolic shape. At the outer transverse bars 6 of a segment 2, the reflector plate 3 is secured against slipping from the guide rail 13 by stops of metal or wood. A reflecting self-adhering aluminum foil 17 is adhered on the top of the web 15 of the guide rail 13 so that even the solar radiation S impinging on the web 15 is reflected onto the absorber pipe A.

When manufacturing the trough-type parabolic concentrator 1, first, the longitudinal and transverse edges 6,7 of the frames 5 are cut to size, provided with comb-like teeth for assembly and with holes for the fastening screws 8 and 10, and shaped at their top edges 11 to take a parable segment shape. Subsequently, the bars 6, 7 are treated with a resin so that no humidity can penetrate into the wood. For the reflector plates 3, anodized aluminum sheet is simply cut to size. These parts are then transported to the building site where the solar thermal power plant is to be erected.

When mounting the parts, first, the longitudinal and transverse bars 6,7 are assembled into frames 5, e.g. by glueing, which are then reinforced by metal bands 9. To mount a segment 2, the frames 5 are joined by screws 8. Thereafter, the individual segments 2 are connected by screws 10. The guide rails 13 for the reflector plates 3 are fastened on the transverse bars 7 of the frames 5 of two adjacent segments. Finally, the reflector plates 3 are inserted into the guide rails 13 and secured therein by stops 16.

Although the present invention has been described with reference to a specific embodiment, a person skilled in the art will readily be able to make modifications thereto to accommodate particular applications. These and other modifications are considered to fall within the scope of the present invention as defined by the appended claims.

What is claimed is:

1. A trough-type concentrator comprising a support structure (4), said support structure (4) being constructed of a plurality of substantially identical segments (2), said segments (2) being arranged in immediately adjacent longitudinal lines, said segments (2) each being defined by a plurality of separate individual frames (5) in immediately adjacent transverse rows with each frame (5) including at least two transversely spaced longitudinal bars (6) and at least two longitudinally spaced transverse bars (7), means (8, 10, respectively) for interconnecting longitudinal bars (6) to each other and transverse bars (7) to each other, and a separate individual reflector plate (3) spanning a plurality of said frames (5).

2. The trough-type concentrator as defined in claim 1 wherein said transverse bars (7) are each of a parabolic shape corresponding substantially to a like parabolic shape of said reflector plate (3).

3. The trough-type concentrator as defined in claim 2 including a second separate individual reflector plate (3) spanning another plurality of said frames (5), said reflector plates (3) including adjacent transverse edges (3a, 3b, FIG. 5), and transversely disposed guide means (15) carried by selected ones of said frames (5) for retaining said adjacent transverse edges (3a, 3b).

4. The trough-type concentrator as defined in claim 3 including means (16) at opposite ends of at least one transverse row for securing opposite longitudinal edges of said reflector plate (3) to associated transversely opposite frames (5).

5. The trough-type concentrator as defined in claim 3 wherein each frame (5) is of a substantially polygonal configuration with adjacent longitudinal and transverse bars defining corners thereof, and means (9) spanning selected diametrically opposite corners for reinforcing an associated frame (5).

6. The trough-type concentrator as defined in claim 3 including means (17) for effecting reflection carried by said guide means (15).

7. The trough-type concentrator as defined in claim 2 including means (16) at opposite ends of at least one transverse row for securing opposite longitudinal edges of said reflector plate (3) to associated transversely opposite frames (5).

8. The trough-type concentrator as defined in claim 2 wherein each frame (5) is of a substantially polygonal configuration with adjacent longitudinal and transverse bars defining corners thereof, and means (9) spanning selected diametrically opposite corners for reinforcing an associated frame (5).

9. The trough-type concentrator as defined in claim 1 including a second separate individual reflector plate (3) spanning another plurality of said frames (5), said reflector plates (3) including adjacent transverse edges (3a, 3b, FIG. 5), and transversely disposed guide means (15) carried by selected ones of said frames (5) for retaining said adjacent transverse edges (3a, 3b).

10. The trough-type concentrator as defined in claim 9 including means (17) for effecting reflection carried by said guide means (15).

11. The trough-type concentrator as defined in claim 1 including means (16) at opposite ends of at least one transverse row for securing opposite longitudinal edges of said reflector plate (3) to associated transversely opposite frames (5).

12. The trough-type concentrator as defined in claim 1 wherein said reflector plate (3) is an aluminum sheet having an anodized surface.

13. The trough-type concentrator as defined in claim 1 wherein said reflector plate (3) is non-reflective sheet metal having thin mirrors attached thereto.

14. The trough-type concentrator as defined in claim 1 wherein each frame (5) is of a substantially polygonal configuration with adjacent longitudinal and transverse bars defining corners thereof, and means (9) spanning selected diametrically opposite corners for reinforcing an associated frame (5).

* * * * *